(12) United States Patent
Johnson

(10) Patent No.: US 7,300,976 B2
(45) Date of Patent: Nov. 27, 2007

(54) FLUOROCHEMICAL OLIGOMERIC POLISH COMPOSITION

(75) Inventor: Mitchell T. Johnson, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 483 days.

(21) Appl. No.: 10/865,147

(22) Filed: Jun. 10, 2004

(65) Prior Publication Data

US 2005/0277718 A1    Dec. 15, 2005

(51) Int. Cl.
    *C09G 1/06*    (2006.01)
(52) U.S. Cl. .................. 524/591; 524/278; 252/8.62
(58) Field of Classification Search ............... 524/591, 524/261, 588, 462, 278
    See application file for complete search history.

(56) References Cited

U.S. PATENT DOCUMENTS

| | | | |
|---|---|---|---|
| 2,803,615 A | 8/1957 | Ahlbrecht et al. | |
| 2,841,573 A | 7/1958 | Ahlbrecht et al. | |
| 3,890,271 A | 6/1975 | Kokoszka | |
| 3,960,575 A | 6/1976 | Martin | |
| 5,085,695 A | 2/1992 | Randen et al. | |
| 5,216,097 A | 6/1993 | Allewaert et al. | |
| 5,414,111 A | 5/1995 | Kirchner | |
| 5,565,564 A | 10/1996 | Kirchner | |
| 5,629,372 A | 5/1997 | Anton et al. | |
| 5,817,249 A | 10/1998 | Audenaert et al. | |
| 5,910,557 A | 6/1999 | Audenaert et al. | |
| 5,962,074 A | 10/1999 | Wollner | |
| 6,162,369 A * | 12/2000 | Allewaert et al. | ......... 252/8.62 |
| 6,193,791 B1 * | 2/2001 | Vander Louw et al. | ......... 106/3 |
| 6,224,782 B1 * | 5/2001 | Allewaert et al. | ......... 252/8.62 |
| 6,235,824 B1 * | 5/2001 | Vander Louw et al. | ..... 524/278 |
| 6,451,717 B1 | 9/2002 | Fitzgerald et al. | |
| 6,617,267 B2 | 9/2003 | Soane et al. | |
| 6,624,268 B1 | 9/2003 | Maekawa et al. | |
| 6,664,354 B2 | 12/2003 | Savu et al. | |
| 6,890,360 B2 * | 5/2005 | Cote et al. | .................. 8/115.6 |
| 2002/0147295 A1 | 10/2002 | Turri et al. | |
| 2003/0026997 A1 | 2/2003 | Qiu et al. | |
| 2003/0149106 A1 | 8/2003 | Mosbey et al. | |
| 2003/0204015 A1 | 10/2003 | Burleigh et al. | |
| 2005/0113508 A1 | 5/2005 | Jarlwala et al. | |

FOREIGN PATENT DOCUMENTS

WO    WO 93/01349    1/1993

OTHER PUBLICATIONS

H. C. Fielding; "Organofluorine Surfactants and Textile Chemicals", Organofluorine Chemicals and Their Industrial Applications, R.E.Banks, Ed., Society of Chemical Industry, (1979), . pp. 214-234.
A. Davidsohn and B. M. Mildowsky; Polishes, C.R.C. Press, Cleveland, OH, 1968, pp. 68-73.
C. R. Noller; Chemistry of Organic Compounds, Third ed., 1966, Waxes, Fats, and Oils, pp. 205-218.
Kirk-Othmer; *Encyclopedia of Chemical Technology*, Third ed., 1985, vol. 24, "Waxes", pp. 466-481.
Kirk-Othmer; *Encyclopedia of Chemical Technology*, Fourth ed, vol. 19, "Polishes", pp. 444-453.
*Ring-Opening Polymerization*, vol. 1,2 & 3, edited by K.J. Ivin and T. Saegusa, 1984.
M.P.Stevens; Polymer Chemistry: An Introduction, Second ed, 1990, pp. 346-351 and pp. 360-368.
G. Odian; *Principles of Polymerization*, Third Ed., 1991, pp. 535-558.

* cited by examiner

*Primary Examiner*—Katarzyna Wyrozebski
(74) *Attorney, Agent, or Firm*—Kent S. Kokko

(57) ABSTRACT

A method of treating hard substrates by contacting the substrate with a fluorochemical composition comprising: a fluorochemical urethane component and a base component is described. The compositions provide desirable repellency, antisoiling and anti-staining properties to the substrates.

21 Claims, No Drawings

FLUOROCHEMICAL OLIGOMERIC POLISH COMPOSITION

FIELD OF THE INVENTION

The present invention is directed to a protective composition for hard substrates, such as wood furniture, and for a combination of cleaner-protective composition for such hard substrates.

BACKGROUND

The utility of organofluorine compounds as surface-active agents (i.e., surfactants) and surface-treating agents is due in large part to the extremely low free-surface energy of a $C_6$-$C_{12}$ fluorocarbon group, according to H. C. Fielding, "Organofluorine Compounds and Their Applications," R. E. Banks, Ed., Society of Chemical Industry at p. 214 (1979). Generally, the organofluorine substances described above are those which have carbon-bonded fluorine in the form of a monovalent fluoroaliphatic radical such as a perfluoroalkyl group, typically —$C_nF_{2n+1}$, where n is at least 3, the terminal part of which group is trifluoromethyl, —$CF_3$.

Protective coatings for hard substrates, such as wood furniture surfaces and the like, are designed to protect the underlying surface by filling the crevices, pores and other defect therein. These vary from permanent coatings requiring spraying, or brush applications such as shellac, nitrocellulose lacquers, varnish, or polyurethanes to temporary coatings comprising various oils and waxes. The latter usually consist of blends of mineral, vegetable, silicone and/or essential oils and small amounts of waxes. While these oils are easy to apply, they often tend to leave a greasy film and they, like the permanent coatings, do not provide much protection against water and alcohol spotting. Furniture polishes may include liquid or paste solvent waxes, clear oil polishes, emulsion oil polishes, emulsion wax polishes, and aerosol or spray polishes. Solvents are often added to the formulations to provide detergency (i.e. to remove soils and previously applied polishes), dissolve or disperse the components, and to control the dry rate of the polish after application.

SUMMARY OF THE INVENTION

Although there are many polishes known, they provide little protection to soils from food and drink stains, and may be difficult to apply, and still provide a desirable level of gloss. It is desirable for a polish to aid in cleaning and protecting the substrate finish from such common damaging effects as finger marking, food and drink stains and soils, and other surface deposits. They must be easy to apply, to spread, minimally buffed to a shine, and any excess must be easily removed.

This invention provides a polish composition for treating substrates, particularly hard substrates such as finished wood furniture, to render the substrates durably resistant to soiling and durably repellent to water, oil and other liquids. The composition comprises a) a base component and b) a fluorochemical urethane component comprising one or more alkylated fluorochemical oligomeric compounds. The base component is selected from waxes, silicone oils, hydrocarbon oils and mixtures thereof. The fluorochemical urethane component comprises (i) the residue of an isocyanate, (ii) a fluorochemical oligomeric moiety comprising an aliphatic backbone with a plurality of pendant fluoroaliphatic groups and optionally non-fluorinated aliphatic groups; (iii) an aliphatic moiety of 12 to 75 carbon atoms; and (iv) isocyanate-derived linking groups which links the fluorochemical oligomeric moiety to the residue of the isocyanate and optionally the aliphatic moiety (iii) to the residue of the isocyanate (i). The aliphatic group may be pendant from the fluorochemical oligomeric moiety or the residue of an isocyanate.

In another aspect, the invention provides a method of treating substrates comprising contacting the substrate with the polish composition (as further described herein) and may comprise a solution, dispersion or suspension in a solvent. In another aspect, the present invention provides a treated substrate comprising a coating of the treatment composition on at least a portion of the substrate. The polish composition can be applied in the form of an aqueous dispersion or emulsion, or as a solution thereof in an organic solvent. The aqueous dispersions are preferred for environmental reasons.

"Fluoroaliphatic", used in reference to the $R_f$ group of Formula I (below) is a stable, inert, preferably saturated, non-polar, monovalent aliphatic radical in which the majority of carbon bonded hydrogen atoms are replaced with fluorine atoms. It can be straight chain, branched chain, cyclic, or combinations thereof. It can contain catenary hetero-atoms, bonded only to carbon atoms, such as oxygen, divalent or hexavalent sulfur, or nitrogen. It is preferably a fully-fluorinated radical, but hydrogen or chlorine atoms can be present as substituents if not more than one atom of either is present for every two carbon atoms. The fluoroaliphatic radical has at least 3 carbon atoms, preferably 3 to 20 carbon atoms and most preferably about 3 to about 7 carbon atoms, and preferably contains about 35% to about 78% fluorine by weight, more preferably about 40% to about 78% fluorine by weight, based on the weight of the group. The terminal portion of the fluoroaliphatic radical is a perfluorinated moiety which will preferably contain at least 7 fluorine atoms, e.g., —$CF_2CF_2CF_3$) or the like. The preferred fluoroaliphatic group is fully or substantially fluorinated and is preferably a perfluorinated aliphatic radical (i.e. a perfluoroalkyl) of the formula —$C_nF_{2n+1}$ where n is from 3 to 20, most preferably 3 to 7.

Unless otherwise stated, the following terms used in the specification and claims have the meanings given below:

"Alkyl" means a linear or branched saturated monovalent hydrocarbon radical having from one to about twelve carbon atoms or a branched saturated monovalent hydrocarbon radical, e.g., methyl, ethyl, 1-propyl, 2-propyl, pentyl, and the like.

"Alkylene" means a linear saturated divalent hydrocarbon radical having from one to about twelve carbon atoms or a branched saturated divalent hydrocarbon radical, e.g., methylene, ethylene, propylene, 2-methylpropylene, pentylene, hexylene, and the like.

"Heteroalkyl" has essentially the meaning given above for alkyl except that one or more catenary heteroatoms (i.e. oxygen, sulfur, and/or nitrogen) may be present in the alkyl chain, these heteroatoms being separated from each other by at least one carbon, e.g., $CH_3CH_2OCH_2CH_2$—, $CH_3CH_2OCH_2CH_2OCH(CH_3)CH_2$—, $C_4F_9CH_2CH_2SCH_2CH_2$—, and the like.

"Heteroalkylene" has essentially the meaning given above for alkylene except that one or more catenary heteroatoms (i.e. oxygen, sulfur, and/or nitrogen) may be present in the alkylene chain, these heteroatoms being separated from each other by at least one carbon, e.g., —$CH_2OCH_2O$—, —$CH_2CH_2OCH_2CH_2$—, —$CH_2CH_2N(CH_3)CH_2CH_2$—, —$CH_2CH_2SCH_2CH_2$—, and the like.

"Aliphatic" means a linear or branched saturated mono- or polyvalent hydrocarbon radical.

"Perfluoroaliphatic" has essentially the meaning given above for "aliphatic" except that all or essentially all of the hydrogen atoms of the aliphatic radical are replaced by fluorine atoms.

"Isocyanate-reactive functional group" means a functional group that is capable of reacting with an isocyanate group, such as hydroxyl, amino, thiol, etc.

"Perfluoroalkylene" has essentially the meaning given above for "alkylene" except that all or essentially all of the hydrogen atoms of the alkylene radical are replaced by fluorine atoms, e.g., perfluoropropylene, perfluorobutylene, perfluorooctylene, and the like "Perfluoroheteroalkyl" has essentially the meaning given above for "heteroalkyl" except that all or essentially all of the hydrogen atoms of the heteroalkyl radical are replaced by fluorine atoms and the number of carbon atoms is from 3 to about 100, e.g. $CF_3CF_2OCF_2CF_2-$, $CF_3CF_2O(CF_2CF_2O)_3CF_2CF_2-$, $C_3F_7O(CF(CF_3)CF_2O)_mCF(CF_3)CF_2-$ where m is from about 10 to about 30, and the like.

"Perfluoroheteroalkylene" has essentially the meaning given above for "heteroalkylene" except that all or essentially all of the hydrogen atoms of the heteroalkylene radical are replaced by fluorine atoms, and the number of carbon atoms is from 3 to about 100, e.g., $-CF_2OCF_2-$, $-CF_2O(CF_2O)_n(CF_2CF_2O)_mCF_2-$, and the like.

As used herein "waxes" refers to low melting organic compounds or mixtures of compounds that are solid at 20° C., and may be natural or synthetic. Natural waxes include those derived from animal sources, such as beeswax, or lanolin, those derived from vegetable sources such as carnauba, candelilla or bayberry, or mineral sources such as ozocerite, ceresin and montan, and petroleum sources such as paraffin. Synthetic waxes include ethylenic polymers and polyol ether-ester such as Carbowax, chlorinated napthalenes such as Halowax and other derived from Fischer-Tropsch synthesis.

"Hydrocarbon oils" includes those straight, or branched chain, saturated or unsaturated aliphatic or aromatic hydrocarbon compounds having a vapor pressure less than 1 torr, preferably less than 0.5 torr an most preferably less than 0.1 torr, and are liquids at 20° C. Useful hydrocarbon oils include mineral oils. Paraffinic oils are most preferred as they show little tendency to yellow with age. Paraffin oils are either pressed or dry-distilled from paraffin distillate.

As used herein "polish" refers to a substance that cleans, imparts smoothness, surface protection and/or a decorative finish to a substrate. The polish may be in solid, liquid or semisolid form and may be in solution, emulsion, suspension or neat.

The term "silicone" or "silicone oil" as used herein includes polydiorganosiloxanes (and moieties derived therefrom) wherein each organo group is independently selected from the group consisting of alkyl groups (such as $C_1$ to $C_{12}$ alkyl groups, for example).

"Solvent" refers to a liquid compound that can dissolve or disperse the components of the polish composition.

"Hard substrate" means any rigid material that maintains its shape, e.g., glass, ceramic, concrete, natural stone, wood, metals, plastics, and the like.

"Perfluorinated group" means an organic group wherein all or essentially all of the carbon bonded hydrogen atoms are replaced with fluorine atoms, e.g. perfluoroalkyl, perfluoroheteroalkyl, and the like.

"Polyisocyanate" means a compound containing an average of greater than one, preferably two or more isocyanate groups, —NCO, attached to a multivalent organic group, e.g. hexamethylene diisocyanate, the biuret and isocyanurate of hexamethylene diisocyanate, and the like.

"Perfluoroalkyl" means all or essentially all of the hydrogen atoms of the alkyl radical are replaced by fluorine atoms.

"Repellency" is a measure of a treated substrate's resistance to wetting by oil and/or water and or adhesion of particulate soil. Repellency may be measured by the test methods described herein.

"Resistance" in the context of soiling or staining is a measure of the treated substrate's ability to avoid staining and/or soiling when contacted by stain or soil respectively.

"Release" is a measure of the treated substrate's ability to have soil and/or stain removed by cleaning or laundering.

DETAILED DESCRIPTION

The treatment composition comprises a base component and a fluorochemical urethane component comprising one or more alkylated fluorochemical oligomeric compounds. The base component is selected from waxes, silicone oils, hydrocarbon oils and mixtures thereof. The fluorochemical urethane component comprises (i) the residue of an isocyanate, (ii) a fluorochemical oligomeric moiety comprising an aliphatic backbone with a plurality of pendant fluoroaliphatic groups and optionally non-fluorinated aliphatic groups; (iii) an aliphatic moiety of 12 to 75 carbon atoms; and (iv) isocyanate-derived linking groups which links the fluorochemical oligomeric moiety to the residue of the isocyanate and optionally the aliphatic moiety (iii) to the residue of the isocyanate (i). The aliphatic group may be pendant from the fluorochemical oligomeric moiety or the residue of an isocyanate.

The fluorochemical oligomeric moiety of the fluorochemical urethane component contains a plurality of pendant fluoroaliphatic groups proximal to one another (e.g., located on alternating carbon atoms of an aliphatic backbone, or occasionally on adjacent carbon atoms), as distinct from isolated fluoroaliphatic groups randomly distributed throughout the compound and also as distinct from fluoroaliphatic groups uniformly located on adjacent carbon atoms.

Useful silicone oils for the base component include those dialkyl polysiloxanes having an effective dynamic viscosity range of from 50 to 10,000 cps. As noted in Davidsohn and Mildowsky, *Polishes*, C.R.C Press, Cleveland, Ohio., 1968, pp. 68-73, a silicone oil may constitute the major or minor component of a base material for polishes. Where it is used as the major component, the silicone oil improves lubricity, ease of buffing, and serves as a release agent for soils and stains. Silicone oils spread easily, provide uniform high gloss and good water repellency. Minor amounts of waxes may be added to the silicone oils to improve polishing of rough or scratched finishes, to reduce water spotting, or to reduce the overall cost of the formulation. When silicone oils are uses as a minor component, it is used to provide ease of application and greater depth of gloss.

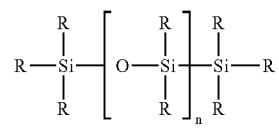

A useful class of silicone oils includes dialkyl polysiloxanes of the formula: Where each R is independently chosen from alkyl or aryl groups. Preferably R is methyl to produce dimethyl polysiloxanes. Useful silicone oils also include hydroxy- or amino-terminated dialkyl polysiloxanes such as those taught in U.S. Pat. No. 3,890,271 (Kokoszka) and U.S. Pat. No. 3,960,575 (Martin), the disclosures of which are herein incorporated by reference.

The waxes or mixtures of waxes that can be used include waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenated coconut oil or soybean oil, and the mineral waxes such as paraffin or ceresin.

The waxes are characteristically insoluble in water, but soluble in most organic solvents. The wax component provides desired hardness, rub-out, and hand properties to the wax composition, and allows the wax composition to "bind" a solvent, i.e. solvent is bound or trapped within the wax phase, permitting rub-out that yields a high gloss, streak and smear free finish. Any of the wax materials known in the wax art can be used, and preferably the wax composition contains a blend of two or more waxes. Waxes that have been found to be useful include, synthetic waxes, natural waxes such as animal and vegetable waxes, mineral waxes, and micro-crystallized, oxidized, or chemically modified derivatives thereof. Examples of animal waxes include spermaceti, beeswax, wool, Chinese insect wax, and shellac wax. Examples of vegetable waxes include carnauba, candelilla, palm, bayberry, jojoba, sugar cane wax, rice-bran, flax, peat, Japan, ouricury, and ceresine. Examples of synthetic waxes include ethylenic polymers, polyether esters, and chlorinated naphthalenes, etc. Examples of mineral waxes include paraffin; polyethylene, montan, ozocerite, petrolatum, etc. Paraffin waxes are derived from straight-chain hydrocarbons with 26-30 carbon atoms per molecule. Microcrystalline waxes are derived from branched-chain hydrocarbons having 41-50 carbon atoms per molecule. Montan waxes are preferred in practicing the invention. An especially preferred montan wax is LP Wax available from American Hoechst Corp., Industrial Chemicals Division.

One useful wax is natural carnauba wax, which can comprise a mixture of esters of $C_{24}$ and $C_{28}$ normal fatty acids; $C_{32}$ and $C_{34}$ n-alcohols; ω-hydroxy acids, $HO(CH_2)_xCOOH$, where x is 17-29; and smaller amounts of esterified α,ω-diols, $HO(CH_2)_yOH$, where y is 22 to above 28 (see Noller, *Chemistry of Organic Compounds* p. 206 (Third ed. 1966)). Natural carnauba wax is further known to contain amounts of cinnamic aliphatic diester, lactides, and hydrocarbons (see Kirk-Othmer Encyclopedia of Chemical Technology, Volume 24, page 469, (Third ed., 1985)).

Selected waxes can be alkoxylated by reaction of free alcohols, olefinic groups, and acids contained therein with alkoxylating agents such as alkylene oxides (e.g., ethylene oxide, propylene oxide, etc., or combinations thereof), to produce a wax that comprises polymerized alkoxy groups attached to molecules of the wax. Alkoxylation of wax molecules occurs through ring-opening polymerization reactions that are well known in the polymer art. For example, the chemistry and mechanisms of ring-opening polymerization are discussed in detail in *Ring-Opening Polymerization* (Volumes 1, 2 & 3) edited by K. J. Ivin and T. Saegusa, 1984, and more generally in M. P. Stevens, *POLYMER CHEMISTRY: AN INTRODUCTION* pp. 346-351, 360-368 (Seconded., 1990). The kinetics of ring-opening polymerization chemical reactions are described in G. G. Odian, *Principles of Polmerization* pp. 535-558 (Third ed., 1991). The alkylene oxide compound chosen to be reacted onto the wax, as well as the chain length of the resulting poly(alkoxy) groups, can be chosen to provide desirable properties for the wax composition (e.g., for rub-out, hand, softness, etc.).

Natural carnauba wax can be alkoxylated by reacting the free alcohol group, the acid group, or the olefinic group of the cinnamic aliphatic diester with alkylene oxide. Some of the crystalline esters (comprising the major component of carnauba wax) can also be cleaved during the reaction and the resulting acids and alcohols also react with alkylene oxide during the alkoxylation process, increasing the yield of alkoxy adducts. The free acids, alcohols, olefinic groups, and that fraction of the esters that are cleaved can be referred to as "ring-opening initiating groups". A portion of the alkylene oxides can also be hydrolyzed to the corresponding glycols that then react with additional alkylene oxide to form a minor amount of water extractable polyalkylene glycol oligomer.

As an example of the production of an alkoxylated wax, natural carnauba wax (100 parts by weight) can be reacted with about 25 parts by weight of a mixture of ethylene oxide (EO) and propylene oxide (PO) (preferably in a weight ratio in the range from 90:10 to 99:1, for example about 95:05) to attach a poly(alkoxy) group at ring-opening initiating groups. Preferably the resulting poly(alkoxy) group can be comprised of an average of about eleven EO/PO polymerized monomeric units. EO/PO modified carnauba wax of this type is commercially available from Koster Keunen, Inc., of Watertown, Conn.

Alkoxylated carnauba wax is a preferred wax component because alkoxylated carnauba wax has been found to be softer than natural carnauba wax and provides an improved "feel" or "hand" to a wax composition, and also because an alkoxylated carnauba wax provides desired phase stability to a wax composition. The improved phase stability provides an advantage in processing the wax composition. Because these wax compositions will not phase separate when in a liquid state, precautions of preventing phase separation of the liquid wax composition are not required. As a result the wax composition comprising alkoxylated carnauba wax can be poured into a packaging container in a single step without waiting for the composition to cool and solidify, and the composition will not phase separate.

When the base component is a wax, silicone fluids may be added to the polish composition to aid rub-out by acting as a lubricant. Specific examples of silicone fluids include polydimethylsiloxane (PDMS), preferably having a kinematic viscosity in the range from about 50 to 100,000 centistoke ($mm^2$/sec), more preferably from 100 to 30,000 centistoke, and most preferably about 350 centistoke. Preferred amounts of silicone fluid have been found to be in the range from about 4 to 13 parts by weight silicone fluid based on 100 parts by weight of the wax base component. Reactive silicone fluids such as Dow Corning 531 and 536 are aminofunctional polydimethylsiloxane copolymers that impart additional performance advantages in the form of increased detergent resistance, increased durability, and high gloss. These materials are available from Dow Corning of Midland, Mich. In another embodiment, hydrocarbon oils such as mineral oil may be added to waxes.

Useful hydrocarbon oils includes those straight, or branched chain, saturated or unsaturated aliphatic or aromatic hydrocarbon compounds having a vapor pressure less than 1 torr, preferably less than 0.5 torr an most preferably less than 0.1 torr, and are liquids at 20° C. Useful hydrocarbon oils include mineral oils. Paraffinic oils are most preferred as they show little tendency to yellow with age. Paraffin oils are either pressed or dry-distilled from paraffin distillate.

The hydrocarbon oils may be used as a solution, suspension or dispersion in an organic solvent, or may be used as aqueous emulsions. The surfactant employed may be any one of many known surfactants used to obtain oil-in-water emulsions or water-in-oil emulsions. The only requirement is that the emulsifier be compatible with the other components.

Emulsifiers of the nonionic type have been found to be particularly suitable in promoting the emulsification of hydrocarbon oil and water. Emulsifiers which have been found especially suitable for the preparation of water-in-oil emulsions of white mineral oil and water to provide the compositions of the invention are sorbitan fatty acid esters e.g., sorbitan monopalmitate, sorbitan monolaurate, sorbitan monostearate, sorbitan monooleate, sorbitan tristearate, sorbitan trioleate, sorbitan sesquioleate; polyglycerol esters of fatty acids, e.g., polyglycerol monooleate and polyglycerol monostearate. The preferred water-in-oil emulsifiers are the fatty acid esters of anhydrosorbitol, polyglycerides of fatty acids, and mono-, di- and tri-ethanolamine stearates. These emulsifiers will have a low HLB (hydrophilic-lipophilic balance), e.g., 2-8, so as to provide a water-in-oil emulsion. Representative commercially available examples of such emulsifiers include sorbitan monooleate sold under the tradename "Span 80", sorbitan monostearate sold under the tradename "Span 60" and the like. Mixtures of these emulsifiers can also be utilized, if desired.

The emulsifiers which have been found particularly suitable for promoting emulsification of hydrocarbon oil and water to provide an oil-in-water emulsification are those having a high HLB, e.g., 9-20, and include the ethoxylated fatty acid esters of anhydrosorbitol e.g., polyoxyethylene sorbitan monolaurate; polyoxyethylene sorbitan monopalmitate; polyoxyethylene sorbitan monostearate; polyoxyethylene sorbitan tristearate; polyoxyethylene sorbitan monooleate; polyoxyethylene sorbitan trioleate (10-30 mols ethylene oxide mol sorbitan), and fatty acid alkanol amides (e.g., that sold under the trade designation "Monamid 150-ADY"). Representative commercially available examples of ethoxylated sorbitan fatty acid emulsifiers include those sold under the trade designations "Tween 80", "Tween 60" and "Tween 40". A representative commercially available fatty acid alkanol amide emulsifier is that sold under the commercial designation "Monamid 150-ADY".

Liquid or low melting solids (i.e. those having melting points less than 30° C., preferably less than 25° C.) are preferred base components for many embodiments of the present inventions. The polish compositions derived from such base components are particularly useful in cleaning hard substrates, such as finished wood substrates, are readily applied, do not leave an appreciable oily residue, do not require buffing, yield a gloss finish, and provide a durable protective finish to the substrate. As demonstrated in the Examples, common soils, such as dirt, oil and food soils do not stick to the treated substrates, and are easily removed.

In one embodiment, the fluorochemical urethane component comprises:

(i) the residue of an isocyanate, which may be a mono- or polyisocyanate, (ii) a fluorochemical oligomeric moiety comprising an aliphatic backbone with a plurality of pendant fluoroaliphatic groups and optionally non-fluorinated aliphatic groups, each fluoroaliphatic group having a fully fluorinated terminal group and each independently linked to a carbon atom of the aliphatic backbone through an organic linking group;

(iii) an aliphatic moiety of 12 to 75 carbon atoms (linked to either of (i) or (ii); and (iv) isocyanate-derived linking groups which links the fluorochemical oligomeric moiety (and optionally the aliphatic moiety) to the residue of the isocyanate.

In one embodiment, the isocyanate is a monoisocyanate and the aliphatic moiety of 12 to 75 carbon atoms may comprise one or more of the non-fluorinated aliphatic groups, linked to a carbon atom of the aliphatic backbone of said fluorochemical oligomeric moiety. In another embodiment, the isocyanate is a polyisocyanate, and the aliphatic moiety of 12 to 75 carbon atoms may be linked to the residue of the polyisocyanate through an isocyanate-derived linking group.

The fluorochemical urethane component may comprise the reaction product of:

i) a polyisocyanate, ii) a fluorochemical oligomeric compound comprising an aliphatic backbone with a plurality of pendant fluoroaliphatic groups, optionally a plurality of non-fluorinated aliphatic groups, each fluoroaliphatic group having a fully fluorinated terminal group and each independently linked to a carbon atom of the aliphatic backbone through an organic linking group, and an isocyanate-reactive terminal group; and iii) an aliphatic compound having an isocyanate-reactive group iv) wherein at least one of said non-fluorinated aliphatic groups or said aliphatic compound has 12 to 75 carbon atoms.

In another embodiment, the fluorochemical urethane component may comprise the reaction product of;

v) an isocyanate, which is preferably a monoisocyanate vi) a fluorochemical oligomeric compound comprising an aliphatic backbone with a plurality of pendant fluoroaliphatic groups, and a plurality of non-fluorinated aliphatic groups of 12 to 75 carbon atoms, each fluoroaliphatic group having a fully fluorinated terminal group and each independently linked to a carbon atom of the aliphatic backbone through an organic linking group, and an isocyanate-reactive terminal group.

In one embodiment, the fluorochemical urethane component comprises compounds of the formula:

$$(A-L^1-)_n[R^1-(L^2-R^2)_m]_p, \qquad \text{(Formula I)},$$

wherein

A is a fluorochemical oligomeric moiety of the formula:

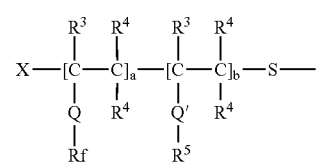

wherein the sum of a+b is an number such that the compound is oligomeric and a is at least 1;

each $R^3$ is independently a hydrogen, halogen, or straight chain or branched chain alkyl containing 1 to about 4 carbon atoms;

each $R^4$ is independently hydrogen or straight chain or branched chain alkyl containing 1 to about 4 carbon atoms;

Q and Q' are each independently a covalent bond or divalent linking group, $R_f$ is a fluoroaliphatic group that comprises a fully fluorinated terminal group;

$R^5$ is a non-fluorinated aliphatic group;

X is a hydrogen atom or a group derived from a free radical initiator;

$L^1$ and $L^2$ are independently isocyanate-derived linking groups, $R^1$ is the residue of an organic isocyanate, $R^2$ is a hydrogen or an aliphatic group, n is 1 to 4, m is 0 to 4, p is 1 to 4 and wherein at least one of said $R^2$ and $R^5$ groups has 12 or more carbon atoms.

With reference to Formula I, it will be understood that one or more fluorochemical oligomeric moieties (shown as A-$L^1$-) may be bonded to the residue of an isocyanate, (shown as $R^1$), where the number of oligomeric moieties is n. Conversely, there may be one or more residues of an isocyanate (shown as —$R^1$-($L^2$-$R^2$) bonded to the oligomeric moiety, where the number of residues is p. Further, one of more aliphatic groups (shown as $R^2$) may also be bonded to the residue of the isocyanate, where the number is m.

With reference to Formulas I and II, at least one of the $R^2$ or $R^5$ groups is an aliphatic group of 12 to 75 carbon atoms. With further reference to Formula II, it will be understood that the fluorochemical oligomeric moiety may have a random distribution of fluorinated and fluorine-free segments, or a sequential arrangement where the oligomer comprises "blocks" of fluorinated and fluorine-free segments, i.e. a block oligomeric copolymer. Further it will be understood that the relative position of the units derived from fluorinated monomers and fluorine-free monomers may vary with respect to the X and S moieties. In essence the following structures are both within the scope of the invention:

III

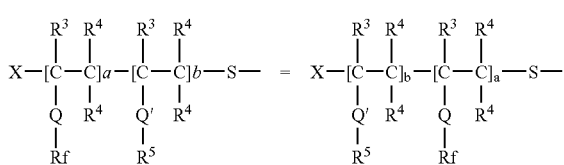

The fluorochemical oligomeric moiety of Formulas II and III generally comprise mixtures of alkylated fluorochemical oligomers. Accordingly, compounds are sometimes referred to herein as having non-integral numbers of particular substituents (e.g., "a=2.7"). In such cases the number indicates an average and is not intended to denote fractional incorporation of a substituent. The terms "oligomer" or "oligomeric" when used herein designate compounds containing a plurality of polymerized units, but fewer than that number of polymerized units present in a polymer (e.g., chains of 3 to about 20 polymerized units are to be considered "oligomeric"). Preferably, the oligomeric portion contains 3 to 10 polymerized units, and more preferably 3 to 7 polymerized units. Further, the ratio of fluorinated to non-fluorinated pendent groups ($R_f$ to $R^5$ groups) is preferably 2:1 or greater.

With reference to Formulas I and II, a particularly preferred embodiment is one in which n=1, m=1, p=1, a=3 to 7 and b=0, as shown in Formula VII, where X, $R^1$, $R^2$, $R^3$, $R^4$, Q, $L^1$ and $L^2$ are as previously defined. Preferably in such embodiments, $R^4$ is H or $CH_3$.

VII

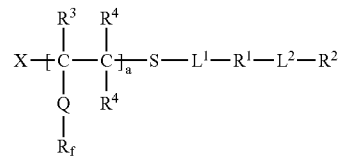

As described above and further illustrated in Formulas I and II, a fluorochemical composition useful in the invention comprises an fluorochemical oligomeric component that generally has three principal portions: a fluorochemical oligomeric moiety "A", a moiety derived from an isocyanate "$R^1$" (which may be a mono- or polyisocyanate) and an aliphatic moiety "$R^2$ and/or $R^5$", where at least one of $R^2$ and $R^5$ have 12 to 75 carbons atoms The fluorochemical oligomeric moiety and the aliphatic moiety are linked to the polyisocyanate residue by linking groups $L^1$ and $L^2$, respectively. The linking groups are derived from a reaction between a an isocyanate-reactive group, such as an alcohol, an amine, or a thiol, and an isocyanate group of a mono- or polyisocyanate As used in the instant specification and claims, the terms "isocyanate-derived" and "isocyanate derivative" designate compounds or groups that are capable of being prepared by a known reaction of an isocyanate. The term isocyanate reactive groups refer to those functional groups that react with an isocyanate by condensation reaction, for example a reactive group such as a hydroxyl will react with an isocyanate group to form a urethane link.

While such compounds or groups are preferably prepared from isocyanates, these terms are not intended to require that an isocyanate actually be used in their preparation. For example, blocked isocyanates may be used. Isocyanate-derived linking groups are referred to herein using a nomenclature system analogous to that from which the term "ureylene" arises with respect to urea-containing compounds. Accordingly, a linking group with the structure of a biuret will be referred to as "biuretylene"; guanidine: "guanidinylene"; carbodiimide: "carbodiimidylene", and so forth. "Non-polymeric" when used to define an isocyanate-derived linking group designates a linking group in which the isocyanate-derived moiety is not a repeating unit in a polymeric chain (e.g., the linking group is not a polyamide or a polyurethane).

The fluorochemical oligomeric moiety comprises a fluoroaliphatic group, designated herein as $R_f$. The fluorinated compound of the invention contains a plurality of pendent $R_f$ groups (e.g., from 2 to about 10) proximal to one another and preferably contains from about 5 percent to about 80 percent, more preferably from about 20 percent to about 65 percent, and most preferably about 25 percent to about 55 percent fluorine by weight, based on the total weight of the group. $R_f$ is a stable, inert, non-polar, preferably saturated, monovalent moiety which is both oleophobic and hydrophobic.

$R_f$ preferably contains at least about 3 carbon atoms, more preferably 3 to about 20 carbon atoms, and most preferably about 3 to about 7 carbon atoms. $R_f$ can contain straight chain, branched chain, or cyclic fluorinated alkylene groups or combinations thereof with straight chain, branched chain, or cyclic alkylene groups. $R_f$ is preferably free of polymerizable olefinic unsaturation and can optionally contain catenary heteroatoms such as divalent oxygen, or trivalent nitrogen. It is preferred that $R_f$ contain about 35% to about 78% fluorine by weight, more preferably about 40% to about 78% fluorine by weight, based on the weight of the group.

The terminal portion of the $R_f$ group contains a fully fluorinated terminal group. This terminal group preferably contains at least 7 fluorine atoms, e.g., $CF_3CF_2CF_2$—, $(CF_3)_2CF$—, or the like. Perfluorinated aliphatic groups (i.e., those of the formula $C_oF_{2o+1}$, where o is 3 to 7) are the most preferred embodiments of $R_f$.

The fluoroaliphatic group $R_f$ and the aliphatic group $R^5$ are each linked to the oligomeric backbone by a linking groups designated as Q and Q' respectively in the Formula II used herein. Q and Q' are independently linking groups that may be a covalent bond, divalent alkylene, or a group that can result from the condensation reaction of a nucleophile such as an alcohol, an amine, or a thiol with and electrophile, such as an ester, acid halide, isocyanate, sulfonyl halide, sulfonyl ester, or may result from a displacement reaction between a nucleophile and leaving group. Each Q and Q' is are independently chosen, preferably contains from 1 to about 20 carbon atoms and can optionally contain catenary oxygen, nitrogen, sulfur, or silicon-containing groups or a combination thereof. Q and Q' is preferably free of functional groups that substantially interfere with free-radical oligomerization (e.g., polymerizable olefinic double bonds, thiols, easily abstracted hydrogen atoms such as cumyl hydrogens, and other such functionality known to those skilled in the art). Examples of suitable linking groups Q and Q' include straight chain, branched chain, or cyclic alkylene, arylene, aralkylene; oxy, oxo, hydroxy, thio, sulfonyl, sulfoxy, amino, imino, sulfonamido, carboxamido, carbonyloxy, urethanylene, urylene, and combinations thereof such as sulfonamidoalkylene. Preferably linking group Q is a sulfonamidoalkylene group.

Suitable linking groups Q and Q' include the following structures in addition to a covalent bond. For the purposes of this list, each k is independently an integer from 0 to about 20, $R_1'$ is hydrogen, aryl, or alkyl of 1 to about 4 carbon atoms, and $R_2'$ is alkyl of 1 to about 20 carbon atoms. Each structure is non-directional, i.e.—$(CH_2)_kC(O)O$— is equivalent to —$O(O)C(CH_2)_k$—.

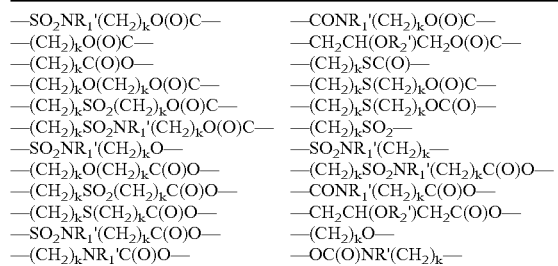

The moiety designated as $R^2$ in Formula I is derived from an isocyanate-reactive compound of the formula $R^2$-$(Z)_q$, where Z is an isocyanate reactive group and q is 1 to 4, preferably 1. As previously described, $R^2$ is a mono- or polyvalent, linear or branched chain, saturated or unsaturated, cyclic or acyclic (or any combination thereof) organic aliphatic group having from 1 to 75 carbon atoms and Z is an isocyanate-reactive functional group such as an amino group, a hydroxy group, or a thiol group. In certain embodiments $R^2$ may be fluorinated (i.e. $R^2=R_f$). Preferably $R^2$ has 12 to 75 carbon atoms. More preferably $R^2$ is a monovalent alkyl group having from 16 to 60 carbon atoms. Where more than one $R^2$ group is present, such as when m is greater than one in Formula I, the sum of the carbon atoms in the $R^2$ groups is preferably from 18 to 100 carbon atoms. Further, where more than one functional group Z is present (q>1), multiple groups of the formula $(A-L^1-)_n-R^1-L^2-$ will be connected with one $R^2$ group.

The moiety designated as $R^1$ in Formula I is derived from an isocyanate, including mono- or polyisocyanates. Isocyanate compounds useful in preparing the fluorochemical oligomers of the present invention comprise isocyanate radicals attached to the mono or polyvalent organic group that can comprise a multivalent aliphatic, alicyclic, or aromatic moiety; or an aliphatic, alicyclic or aromatic moiety attached to a biuret, an isocyanurate, or a uretdione, or mixtures thereof. Preferred polyfunctional isocyanate compounds contain an average of two to six isocyanate (—NCO) radicals. Compounds containing two —NCO radicals are preferably comprised of divalent aliphatic, alicyclic, araliphatic, or aromatic groups to which the —NCO radicals are attached.

Representative examples of suitable isocyanate compounds include isocyanate functional derivatives of the isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof.

Any suitable organic polyisocyanate, such as an aliphatic, alicyclic, araliphatic, or aromatic polyisocyanate, may be used either singly or in mixtures of two or more. The aliphatic polyisocyanate compounds generally provide better light stability than the aromatic compounds. Aromatic polyisocyanate compounds, on the other hand, are generally more economical and reactive toward polyols than are aliphatic polyisocyanate compounds.

Suitable aromatic polyisocyanate compounds include, but are not limited to, those selected from the group consisting of 2,4-toluene diisocyanate (TDI), 2,6-toluene diisocyanate, an adduct of TDI with trimethylolpropane (available as Desmodur™ CB from Bayer Corporation, Pittsburgh, Pa.), the isocyanurate trimer of TDI (available as Desmodur™ IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methoxy-2,4-phenylene diisocyanate, 1-chlorophenyl-2,4-diisocyanate, and mixtures thereof.

Examples of useful alicyclic polyisocyanate compounds include, but are not limited to, those selected from the group consisting of dicyclohexylmethane diisocyanate ($H_{12}$MDI, commercially available as Desmodur™W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), dimmer acid diisocyanate (available from Bayer),1,3-bis(isocyanatomethyl) cyclohexane ($H_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, 2,2,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (Desmodur™ N-100 and N-3200 from Bayer Corporation, Pittsburgh, Pa.), the isocyanurate of HDI (available as Desmodur™ N-3300 and Desmodur™ N-3600 from Bayer Corporation, Pittsburgh, Pa.), a blend of the isocyanurate of HDI and the uretdione of HDI (available as Desmodur™ N-3400 available from Bayer Corporation, Pittsburgh, Pa.), and mixtures thereof.

Examples of useful araliphatic polyisocyanates include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)phenyl isocyanate, m-(3-isocyanatobutyl) phenyl isocyanate, 4-(2-isocyanatocyclohexyl-methyl) phenyl isocyanate, and mixtures thereof.

Useful monoisocyanates include octadecyl isocyanate, butyl isocyanate, hexyl isocyanate, phenyl isocyanate, benzyl isocyanate, naphthyl isocyanate, and the like.

Preferred polyisocyanates, in general, include those selected from the group consisting of the biuret of hexamethylene 1,6-diisocyanate, tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, octadecylisocyanate, and the like, and mixtures thereof.

X, of Formula I, is a group derived from a free-radical initiator. As used herein, the term "free-radical initiator" designates any of the conventional compounds such as organic azo compounds, organic peroxides (e.g., diacyl peroxides, peroxyesters, dialkyl peroxides) and the like that provide initiating radicals upon homolysis. As used herein, the term "group derived from a free-radical initiator" designates an initiating radical formed upon homolytic decomposition of a free-radical initiator.

Suitable groups X include non-reactive groups such as a hydrogen atom, t-butoxy (derived from di-t-butylperoxide), and benzoyloxy (derived from benzoyl peroxide), and reactive groups such as —CCH$_3$(CN)CH$_2$CH$_2$CO$_2$H (derived from azo-4-cyanoisovaleric acid), —C(CH$_3$)$_2$CN (derived from azoisobutyronitrile), and those derived from other known functional azo compounds such as 2,2'-azobis[N-(4-chlorophenyl)-2-methylpropionamidine]-dihydrochloride; 2,2'-azobis[N-(4-hydroxyphenyl)-2-methylpropionamidine] dihydrochloride; 2,2'-azobis[N-(4-aminophenyl)-2-methyl-propionamidine]-tetrahydrochloride; 2,2'-azobis[2-methyl-N-2-propenylpropionamidine]dihydrochloride; 2,2'-azobis [N-(2-hydroxyethyl)-2-methylpropionamidine]-dihydrochloride; 2,2'-azobis[2-methyl-N-(2-hydroxyethyl)-propionamide]; 2,2'-azobis[2-(hydroxymethyl) propionitrile]; 2,2'-azobis[2-methyl-N-[1,1-bis (hydroxymethyl)-2-hydroxyethyl]propionamide]; and 2,2'-azobis {2-methyl-N-[1,1-bis (hydroxymethyl)ethyl]-propionamide}. Preferred groups X include those enumerated above.

The fluorochemical oligomeric compounds corresponding to the fluorochemical oligomeric moiety of Formula II can be prepared by oligomerization of an unsaturated compound having a fluorinated aliphatic pendent group (IV) and optionally an unsaturated compound having a fluorine-free aliphatic pendent group (V) in the presence of a free-radical initiator and chain-transfer agent of the formula (Z)$_q$-L$^1$-SH, where Z is an isocyanate-reactive functional group, according to the following Scheme:

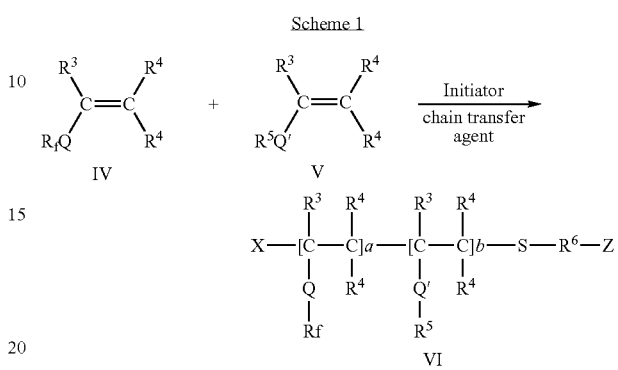

The moiety "R$^6$-Z" corresponds to the linking group moiety L$^1$ of Formula II, wherein R$^6$ is an aliphatic or aromatic organic group having 1 to 20 carbons Compounds of Formula (IV) and methods for the preparation thereof are known and disclosed, e.g., in U.S. Pat. No. 2,803,615 (Ahlbrecht et al.) and U.S. Pat. No. 2,841,573 (Ahlbrecht et al.) which disclosures are incorporated herein by reference. Examples of such compounds include general classes of fluorochemical monomers such as acrylates, methacrylates, vinyl ethers, and allyl compounds containing fluorinated sulfonamido groups, acrylates or methacrylates derived from fluorochemical telomer alcohols, fluorochemical thiols, and the like. Preferred compounds of Formula IV include N-methyl perfluorobutanesulfonamidoethyl acrylate, N-methyl perfluorooctanesulfonamidoethyl methacrylate, N-ethyl perfluorooctanesulfonamidoethyl acrylate, N-ethyl perfluorohexylsulfonamidoethyl methacrylate, the reaction product of isocyanatoethyl methacrylate and N-methylperfluorooctanesulfonamidoethyl alcohol, 1,1-dihydroperfluorooctyl acrylate, N-methyl perfluorooctanesulfonamidoethyl vinyl ether, C$_4$F$_9$SO$_2$NHCH$_2$CH═CH$_2$, and others such as perfluorocyclohexyl acrylate (c-C$_6$F$_{11}$CH$_2$OCOCH═CH$_2$), and tetrameric hexafluoropropyleneoxide dihydroacrylate.

Compounds of Formula V may be selected from alkyl acrylate esters, vinyl acetate, styrene, alkyl vinyl ethers, alkyl methacrylate esters, acrylic acid, methacrylic acid, acrylamide, methacrylamide, acrylonitrile, methacrylonitrile, and N-vinylpyrrolidone. Alkyl acrylate ester monomers useful in the invention include straight-chain, cyclic, and branched-chain isomers of alkyl esters containing C$_1$-C$_{50}$ alkyl groups. Useful specific examples of alkyl acrylate esters include: methyl acrylate, ethyl acrylate, n-propyl acrylate, 2-butyl acrylate, iso-amyl acrylate, n-hexyl acrylate, heptyl acrylate, n-octyl acrylate, iso-octyl acrylate, 2-ethylhexyl acrylate, nonyl acrylate, decyl acrylate, undecyl acrylate, dodecyl acrylate, tridecyl acrylate, octadecylacryalate and octadecylmethacrylate and tetradecyl acrylate.

The chain transfer agent is of the formula (Z)$_q$-R$^6$—SH having a functional group "Z" that may be reacted with an isocyanate group of a mono- or polyisocyanate (designated as R$^1$—(NCO)$_{1-6}$) and an aliphatic or aromatic divalent organic group to form the linking group L$^1$ into the compounds of Formula I. The number of functional groups "Z", designated as "q" may be 1 to 4, and is preferably 1. The functional group Z is chosen to be isocyanate-reactive. Examples include a hydroxy, amino, thiol or carboxyl group.

A compound of Formulas VI may be provided with functional groups, Z, on the $L^1$ linking group (in addition to the sulfhydryl group(s)) through the use of an appropriate functionalized chain-transfer agent $(Z)_q$-$R^6$—SH (where $R^6$ is an aliphatic or aromatic moiety). Suitable functional groups for inclusion in the chain-transfer agent include isocyanate-reactive functional groups such as hydroxy, amino, acid groups and salts thereof, which react with an isocyanate, or are capable of further transformation into such groups.

Examples of such functionalized chain transfer agents include 2-mercaptoethanol (where $R^6$=—$CH_2CH_2$— and Z=—OH), mercaptoacetic acid, 2-mercaptobenzimidazole, 2-mercaptobenzoic acid, 2-mercaptobenzothiazole, 2-mercaptobenzoxazole, 3-mercapto-2-butanol, 2-mercaptosulfonic acid, 2-mercaptonicotinic acid, 4-hydroxythiopheno3-mercapto-1,2-propanediol, 1-mercapto-2-propanol, 2-mercaptopropionic acid, N-(2-mercaptopropionyl)glycine, 2-mercaptopyridine, 2-mercaptopyridine-N-oxide, 2-mercaptopyridinol, mercaptosuccinic acid, 2,3-mercaptopropanesulfonic acid, 2,3-dimercaptopropanol, 2,3-dimercaptosuccinic acid, cystine, and cystine hydrochloride,. Preferred functionalized chain-transfer agents include 2-mercaptoethanol, 3-mercapto-1,2-propanediol, 4-mercaptobutanol, 11-mercaptoundecanol, mercaptoacetic acid, 3-mercaptopropionic acid, 12-mercaptododecanoic acid, 2-mercaptoethylamine, 1-chloro-6-mercapto-4-oxahexan-2-ol, 2,3-dimercaptosuccinic acid, 2,3-dimercaptopropanol, 3-mercaptopropyltrimethoxysilane, 2-chloroethanethiol, 2-amino-3-mercaptopropionic acid, and compounds such as the adduct of 2-mercaptoethylamine and caprolactam.

As can be seen with reference to Formula I, chain transfer agents having multiple isocyanate-reactive functions groups "Z", such as 3-mercapto-1,2-propanediol, may be used to prepare compounds having multiple isocyanate residues $R^1$-($L^2$-$R^2$) connected to a single oligomeric moiety. Further, chain transfer agent having multiple sulfhydryl group, such as 2,3-dimercaptopropanol may be used to provide compounds having multiple oligomeric moieties connect to a single isocyanate residue.

The functionalized chain transfer agent is present in an amount sufficient to control the number of polymerized monomer units in the oligomer. The chain transfer agent is generally used in an amount of about 0.05 to about 0.5 equivalents, preferably about 0.25 equivalents, per equivalent of olefinic monomers IV and optionally V.

Also present in is the preparation of the oligomeric compound VI is a free-radical initiator as defined above in connection with X. Such compounds are known to those skilled in the art and include persulfates, azo compounds such as azoisobutyronitrile and azo-2-cyanovaleric acid and the like, hydroperoxides such as cumene, t-butyl, and t-amyl hydroperoxide, dialkyl peroxides such as di-t-butyl and dicumyl peroxide, peroxyesters such as t-butyl perbenzoate and di-t-butylperoxy phthalate, diacylperoxides such as benzoyl peroxide and lauroyl peroxide.

The initiating radical formed by an initiator can be incorporated into the fluorochemical oligomer to varying degrees depending on the type and amount of initiator used. A suitable amount of initiator depends on the particular initiator and other reactants being used. About 0.1 percent to about 5 percent, preferably about 0.1 percent, to about 0.8 percent, and most preferably about 0.2 percent to 0.5 percent by weight of an initiator can be used, based on the total weight of all other reactants in the reaction.

The oligomerization reaction of Scheme 1 can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methyl ethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREON™ 113, trichloroethylene, α,α,α-trifluorotoluene, fluorinated ethers such as $C_4F_9OCH_3$ and the like, and mixtures thereof.

The oligomerization can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

The fluorochemical urethane component of Formula I may be prepared by reacting a polyisocyanate, the fluorochemical oligomeric compound of Formulas VI having an isocyanate-reactive terminal group Z; and an aliphatic compound having an isocyanate-reactive group ($R^2$-$(Z)_q$). The three reactive components may be combined to form the reaction products of Formula I, or the polyisocyanate may first be reacted with the oligomeric compound of Formula VI, followed by the aliphatic compound of the formula $R^2$-$(Z)_q$, or the polyisocyanate may be reacted first with the aliphatic compound ($R^2$-$(Z)_q$), followed by the oligomeric compound of Formula VI. Compounds of Formula I may also be prepared by reacting a monoisocyanate, and the fluorochemical oligomeric compound of Formula VI having an isocyanate-reactive terminal group, provided that the fluorochemical oligomeric compound of Formula VI, has a pendent aliphatic group ($R^5$) of 12 to 75 carbon atoms.

Depending on reaction conditions (e.g., reaction temperature and/or polyisocyanate used), a catalyst level of up to about 0.5 percent by weight of the total weight of the reactant mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co., Milwaukee, Wis.). Tin compounds are preferred. If an acid catalyst is used, it may be removed from the oligomer or neutralized after the oligomerization.

The molar ratio of fluorochemical oligomeric compound of Formula VI to polyisocyanate is generally from 10 to 95% (mole %) of the available isocyanate groups, with the balance of the isocyanate groups reacted with the aliphatic compound. Preferably, the ratio of the fluorochemical oligomeric compound of Formula VI to polyisocyanate is less than 75% of the available isocyanate groups. Above this amount the repellency performance does not appreciably improve and the cost is higher. Where $R^5$ comprises an aliphatic moiety of 12 to 75 carbon atoms, such as where "m' of Formula II is zero, essentially all of the available isocyanate groups may be reacted with fluorochemical oligomeric compound of Formula VI.

It will be understood that a mixture of fluorochemical oligomeric compounds will result, which is generally a statistical mixture of substitution products on the polyisocyanate. Any remaining isocyanate groups may be reacted or hydrolyzed as desired. In some embodiments it may be desirable to leave some small percentage of the available isocyanate groups unreacted, generally less than 10% (mole %), and hydrolyze the remaining. In the presence of a small amount of water, the unreacted isocyanates will react to form urea links between isocyanate residues.

The oligomer, with its different pendent groups, performs several functions within the polish composition. The aliphatic group allows the oligomer to be compatible with other components of the polish composition, for example with other components that are organic or aliphatic in nature, including the wax component. The aliphatic group also provides adhesion between the oligomer and a substrate. Chemical interaction (e.g., between the aliphatic group and a substrate provides adhesion of the oligomer to the substrate. The improved adhesion between the oligomer and the substrate provides a polish composition having useful durability properties, for instance improved resistance to detergents and mechanical wear. The pendent fluorinated group imparts desired stain resistance, soil resistance and repellency properties to the polish composition of the present invention. More specifically, the pendent fluorinated group provides the polish composition with water and oil repellency.

The pendent aliphatic and fluorinated groups of the oligomer work together to provide a polish coating having desired adhesion, and desired oil, water, and stain repelling properties. While wishing not to be bound by theory, the pendent fluorinated groups are thought to "bloom" to the surface of a coating of the polish composition. At the surface of the coating, the fluorinated groups are able to exhibit their maximum effectiveness in repelling liquids and soils. Migration of the fluorinated groups to the surface of the coating coincidentally results in a stratification of the coating, causing an increased concentration of the aliphatic groups below the surface of the coating, i.e. in the wax or silicone base. This means that while the fluorinated groups are concentrated at the surface of the coating where they are most effective in repelling water, the aliphatic groups are positioned below the coating surface, where these groups can most effectively promote adhesion between the coating and the substrate. Thus, each of the aliphatic and fluorinated groups of the oligomer are believed to become situated within the coating in positions that allow each group to most effectively enhance the adhesion and water repelling properties of the polish coating.

The polish composition can be dissolved, suspended, or dispersed in a variety of solvents to form coating compositions suitable for use in cleaning and treating a substrate. Generally, the solvent solutions can contain from about 0.1 to about 50 percent, or even up to about 90 percent, by weight non-volatile solids (based on the total weight of the components). Aqueous suspensions, emulsions, or solutions are generally preferred and generally can contain a non-volatile solids content of about 0.1 to about 50 percent, preferably, about 1 to about 40 percent, by weight (based on the total weight of the components). Suitable solvents include water, alcohols, esters, glycol ethers, amides, ketones, hydrocarbons, hydrofluorocarbons, hydrofluoroethers, chlorohydrocarbons, chlorocarbons, and mixtures thereof. Depending upon the substrate to which the composition is being applied, water is the preferred solvent due to environmental concerns.

A fluorochemical polish composition is preferably used as an aqueous composition, in particular an aqueous dispersion in water. If the fluorochemical oligomer is made by solution polymerization, it can be dispersed in water, through vigorously mixing the solution oligomer with water in the presence of a surfactant or emulsifier. A solvent free dispersion can be obtained by subsequent distillation of the oligomerization solvent.

The amount of the fluorochemical polish composition (component a) and b)) applied to a substrate in accordance with this invention is chosen so that sufficiently high or desirable repellency, release, anti-staining and antisoiling properties are imparted to the substrate surface, said amount usually being such that 0.01% to 5% by weight, preferably 0.05 to 2% by weight, of fluorine is present on the treated substrate. The amount which is sufficient to impart desired repellency can be determined empirically and can be increased as necessary or desired.

The fluorochemical polish composition may be prepared by combining the base component and the fluorochemical urethane component with vigorous mixing and optional heating. The fluorochemical urethane component may be combined with the base component in any desired ratio, for example from 50:1 to 1:20 fluorochemical urethane component to base component. Generally the amount fluorochemical urethane component will comprise 0.1 to 20 wt. % of the composition (fluorochemical urethane component and base component), preferably 0.2 to 10 wt. % and most preferably 0.5 to 2 wt. %. Surfactants may be used when preparing dispersions, emulsions or suspension in organic solvents or water.

To prepare the aqueous dispersions, the base component and the fluorochemical urethane component, together with cationic or anionic and, if appropriate, nonionic dispersing and/or emulsifying or surfactant agents and, if appropriate, other auxiliaries and solvents, are vigorously dispersed in water, a relatively large amount of energy being supplied. Conventional cationic, nonionic, anionic, and zwitterionic emulsifiers are suitable. To facilitate the preparation of the dispersion, the oligomer product may be dissolved first in solvent or mixture of solvents, and the dispersion is advantageously carried out in two separate steps, predispersion being carried out first, followed by fine dispersion. Predispersion can also be carried out by using high shearing forces, for example by using a high-speed stirrer, such as a dispersing machine of the Ultraturax™ type, and the predispersion thereby obtained is then subjected, for example, to ultrasonic treatment or treatment in a high pressure homogenizer. After this treatment, the particle size in the dispersion generally will be equal to or less than 1 µm to the extent of more than 80%, preferably to the extent of more than 95%. Solventless dispersions can be prepared by removing the solvent by distillation.

Generally, the aqueous dispersion as a concentrate contains 5 to 50% by weight of an active composition (fluorochemical urethane component and base components), 0.5 to 15% by weight of one or more dispersing and/or emulsifying agents, and 0 to 30% by weight of a solvent or solvent mixture, the remainder being water.

Mixtures of water-insoluble solvents with water-soluble solvents can be employed as the solvent for preparation of the dispersion, the amount of the water-insoluble solvent in most cases being greater than the water-soluble solvent. Suitable water-soluble solvents are, for example, mono- or di-alcohols, lower ketones, polyglycol esters, and polyglycol ethers, or mixtures of such solvents. Examples of water-insoluble solvents are esters, ethers, and higher ketones. Low-boiling solvent portions can be removed by, for example, distillation, at a later time, if desired. Preferred water-insoluble solvents are esters or ketones, such as ethyl acetate, butyl acetate, and methyl ethyl ketone.

The polish compositions of the present invention can be applied to a wide variety of hard substrates, including, but not limited to, glass, ceramic, masonry, concrete, natural stone, man-made stone, grout, metals, wood, plastics, and painted surfaces. Finished wood furniture is a particular preferred substrate. Such substrates are particularly subject to staining and soiling, but also benefit greatly from the fluorochemical compositions of the present invention because the coating composition can penetrate into surfaces of the substrate and prevent soils and stains from adhering.

The polish compositions can be applied to a substrate by standard methods such as spraying or wiping (optionally followed by the drying of the treated substrate to remove any remaining water or solvent). The polish compositions can be applied in an amount sufficient to achieve the desired repellency properties for a particular application. This amount can be determined empirically and can be adjusted as necessary or desired to achieve the repellency properties without compromising the properties of the treatable substrate.

In one embodiment the substrate may be sprayed with the fluorochemical polish composition, then wiped to remove soils and provide the desired gloss. If desired, the polish composition may be provided in a suitable aerosol container and formulated with a suitable propellant for aerosol application. Alternatively, the polish composition may be provided in a manually operated pump-type dispenser.

In another embodiment, the substrate may be wiped with a woven or nonwoven cloth or fabric impregnated with the polish composition. Such wiping of the substrate removes soils from the surface of the substrate, which become trapped in the cloth. At the same time, the fluorochemical polish composition is applied to the substrate and gloss is imparted. Such a topical treatment process can involve the use of the neat fluorochemical composition, without added solvent, and is thus preferred from an environmental perspective over the use of organic solvent solutions of the fluorochemical composition. In may cases, additional buffing or "rub-out" is not necessary where the base component is a liquid or low melting solid.

Additionally, the compositions of the invention may also comprise other fluorinated or non-fluorinated repellent materials, softeners, anti stats, anti dust mite or anti microbial additives.

EXAMPLES

Glossary

| Descriptor | Formula, structure and/or name | Availability |
| --- | --- | --- |
| DBTDL | dibutyl tin dilaurate | Sigma-Aldrich, Milwaukee, WI |
| ME | 2-mercaptoethanol; $HSCH_2CH_2OH$ | Sigma-Aldrich |
| N-100 | "DESMODUR N-100"; | Bayer |
| "SERMUL EA 266" | Sodium isotridecyl 15 (EO) sulfate solution | Sasol, Germany |
| SA | Stearyl alcohol; $CH_3(CH_2)_{17}OH$ | Sigma-Aldrich |
| VAZO-67 | $CH_3CH_2C(CN)(CH_3)N\!=\!N(CH_3)(CN)CCH_2CH_3$ | Dupont, Wilmington, DE |
| "DOW CORNING 200 FLUID", 350 cst | Silicone fluid (polydimethylsiloxane) 350 cst | Dow Corning, Midland, MI |
| "SPAN 60" | Sorbitan monostearate | Uniqema, New Castle, DE |
| "DOW CORNING 244 FLUID" | Silicone fluid (cyclic methylsiloxanes) | Dow Corning, Midland, MI |
| "TWEEN 80" | Polyoxyethylene (20) sorbitan monoleate | Uniqema, New Castel, DE |

Test Methods

Food Soil Removal

Approximately 2 grams of French's® Classic Yellow® mustard was evenly applied to the polished wood surface with a wooden tongue depressor to cover an approximate two inch (5 cm) diameter circle. The mustard was allowed to dry at room temperature for 24 hours. The ease with which the dried mustard could be removed from the wood by wiping with a dry cloth was numerically rated, where 1=most difficult removal, 3=easier removal compared to untreated wood, and 5=effortless removal without any moist wiping.

Oil Drop Spread

The ability of the wood surface to repel oil was measured by placing one drop of mineral oil on the polished or unpolished wood surface and observing if the oil drop spread. The numerical value recorded was the multiplier by which the diameter of the oil drop increased as compared to the initial diameter.

Tape Adhesion

To demonstrate the release properties of the wood surface, tape adhesion was observed by placing a piece of 3M Making Tape the wood surface and recording whether or not the tape was able to stick to the surface. In the Table "No" indicates complete release and "Yes" indicates the tape stuck to the surface.

Preparation of MeFBSEA

MeFBSEA, $C_4F_9SO_2N(CH_3)CH_2CH_2OC(O)CH=CH_2$, can be prepared as described in U.S. Pat. No. 6,664,354 (Savu et al.), Example 2, Part A & B.

Preparation of Fluorochemical Urethane Oligomer (MeFBSEA)$_4$SC$_2$H$_4$OH/N-100/SA; 1/1/1

Procedure: To a 5 liter 3 neck round bottom flask was added, MeFBSEA (1233.0 g), 2-mercaptoethanol (58.5 g) and ethylacetate (430.5 g). This solution was heated to 40° F. and deoxygenated 3 times by pulling vacuum to <50 torr and breaking vacuum with nitrogen. VAZO-67 (3.0 g) initiator was then added and heated to a final reaction temperature of 75° C. An exotherm to >90° C. was observed. The heat source was removed and the reaction mixture allowed to cool to 75° C., then held at 75° C. for four hours. At the end of 4 hours another 3.0 grams of VAZO-67 was added and the temperature held overnight at 75° C. 3.0 grams of VAZO-67 was then added, held four more hours, then sampled for residual monomers.

The solution was cooled to 40° C. and stearyl alcohol (202.5 g) was added. The solution was dehydrated at 85° C., then 30 drops of triethylamine was added to adjust pH 7.0. To this solution was added, Desmodur N-100 (286.5 g), ethyl acetate (756.6 g) and catalyst dibutyltindilaurate (100 mg). The reaction temperature was increased to 75° C. and reacted for 4 hours. The infrared spectrum showed a peak corresponding to remaining —NCO so an additional catalyst charge was added (50 mg) and reacted overnight. After 14 hours, the IR showed no peak @ 2270 cm−1, corresponding to complete reaction of all NCO.

The emulsification was conducted after the reaction mixture was cooled to 40° C. The initial solids content of the mixture was 41.6% solids. A premix of Sermaul EA-266 (319.2 g), de-ionized water (3192 g) was heated to 50° C. The organic solvent solution was also heated to 50° C. and added to the water solution and mixed for 15 minutes. The mixture was homogenized by passing it through twice at 3000 psi (~20.7 MPa) in a laboratory Mauten Gaulen high-pressure homogenizer. The ethyl acetate was removed under reduced pressure to obtain a solvent-free anionic dispersion (approximately 30% solids).

Examples 1-8

Samples of furniture polish having the fluorochemical urethane additive were prepared by adding the above fluorochemical urethane emulsion to the liquid phase of Pledge® furniture polish (taken from a can of Lemon Pledge® Aerosol Furniture Polish and after removal of the propellant) while stirring at high shear (for example, using a three blade propeller stirrer), followed by continued mixing for approximately 30 minutes. The Pledge® liquid phase was approximately 8% silicone solids, 14% aliphatic solvent, and the remainder water. The appropriate amounts were blended to obtain the ratios of Pledge® liquid phase to fluorochemical urethane emulsion represented in the Table.

Example 9

Example 9 was prepared by combining the ingredients below and homogenizing for approximately 2 minutes using a Bronson Sonifier at ambient temperature.

| Ingredients | Weight % |
|---|---|
| Fluorochemical urethane | 1.0 |
| "DOW CORNING 200 FLUID", 350 cst | 2.0 |
| Mineral oil | 2.0 |
| "SPAN 80" | 1.3 |
| "DOW CORNING 244 FLUID" | 18.0 |
| "TWEEN 80" | 0.7 |
| Water | 75.0 |

A small amount of the furniture polish prepared in Examples 1-9 (approximately one gram) was poured onto a cotton cloth and a wood surface was wiped with the polish several times until a smooth, uniform coating was obtained. The wood used for testing was a piece of mahogany having a nitrocellulose finish. The samples were tested for food soil removal, oil repellency, tape adhesion, and gloss. Unpolished wood and wood polished with Lemon Pledge® Aerosol Furniture Polish, Endust Aerosol Furniture Polish and Old English® Furniture Oil were tested for comparison. Data is summarized in Table 1.

TABLE 1

| Example | Wt. ratio of Pledge (or silicone) liquid phase:Fluorochemical urethane | Food Soil Removal | Oil Drop Spread | Tape adhesion | 60° Gloss[a] |
|---|---|---|---|---|---|
| 1 | 95:5 | 5 | 1.2 | No | >40 |
| 2 | 90:10 | 5 | 1 | No | >40 |
| 3 | 85:15 | 5 | 1 | No | >40 |
| 4 | 80:20 | 5 | 1 | No | >40 |
| 5 | 70:30 | 5 | 1 | No | 38 |
| 6 | 60:40 | 5 | 1 | No | 30 |
| 7 | 50:50 | 5 | 1 | No | 10[b] |
| 8 | 33:66 | 5 | 1 | No | 10 |
| 9 | 90:10 | 5 | 1.5 | No | 40 |
| Lemon Pledge ®[c] | — | 3 | 4 | Yes | 40 |
| Old English ® | — | 1 | 4 | Yes | 40[d] |
| Endust ® | — | 1 | 4 | Yes | 40 |
| Untreated wood | — | 1 | 2 | Yes | 22 |

[a]Gloss measurements were obtained using micro-TRI-gloss recorder made by BYK Gardner.
[b]Needed to buff after drying to obtain gloss >25
[c]This was a heavy treatment with Pledge ® (i.e., did not remove excess)
[d]Very greasy, oily film

What is claimed is:

1. A polish composition comprising:
   i) a base component selected from the group consisting of waxes, silicone oils, hydrocarbon oils and mixtures thereof; and
   ii) an alkylated fluorochemical oligomeric compound of the formula:

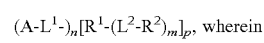, wherein

A is a fluorochemical oligomeric moiety of the formula

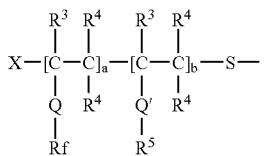

wherein the sum of a+b is an number such that the compound is oligomeric, and a is at least 1;
$R^1$ is the residue of an aliphatic or aromtic polyisocyanate;
$R^3$ is hydrogen, halogen, or straight chain or branched chain alkyl containing 1 to about 4 carbon atoms;
each $R^4$ is independently hydrogen or straight chain or branched chain alkyl containing 1 to about 4 carbon atoms;
Q and Q' are each independently a covalent bond or an organic linking group,
$R_f$ is a fluoroaliphatic group that comprises a fully fluorinated terminal group;
$R^5$ is a fluorine-free aliphatic group;
X is a hydrogen atom or a group derived from a free radical initiator;
$L^1$ and $L^2$ are independently isocyanate-derived linking groups,
$R^2$ is an aliphatic group,
n is 1 to 4, m is 0 to 4, and p is 1 to 4,
wherein at least one of said $R^2$ and $R^5$ groups has 12 or more carbon atoms.

2. The composition of claim 1 wherein the ratio of a to b of said alkylated fluorochemical oligomeric compound (ii) is at least 2:1.

3. The composition of claim 1, wherein $R_f$ has the structure $C_oF_{2o+1}$, where o is 3 to 7.

4. The composition of claim 1, wherein each of $L^1$ and $L^2$ are derived from the reaction of a nucleophilic group with an isocyanate group.

5. The composition of claim 4 wherein $L^1$ and $L^2$ are independently selected from a ureylene, a urethanylbiuretylene, a guanidinylene and a carbodiimidylene.

6. The composition of claim 1 wherein the sum of a+b of said fluorochemical oligomeric moiety is 3 to 20.

7. The composition of claim 1 wherein the amount of fluorochemical oligomeric compound is from about 0.1 to 20 wt. % of said composition.

8. The composition of claim 1, wherein Q and Q' of said fluorochemical oligomer moiety are independently selected from the following structures, wherein each k is independently an integer from 0 to about 20, $R_1$' is hydrogen, aryl, or alkyl of 1 to about 4 carbon atoms, and $R_2$' is alkyl of 1 to about 20 carbon atoms:

| | |
|---|---|
| —SO$_2$NR$_1$'(CH$_2$)$_k$O(O)C— | —CONR$_1$'(CH$_2$)$_k$O(O)C— |
| —(CH$_2$)$_k$O(O)C— | —CH$_2$CH(OR$_2$')CH$_2$O(O)C— |
| —(CH$_2$)$_k$C(O)O— | —(CH$_2$)$_k$SC(O)— |
| —(CH$_2$)$_k$O(CH$_2$)$_k$O(O)C— | —(CH$_2$)$_k$S(CH$_2$)$_k$O(O)C— |
| —(CH$_2$)$_k$SO$_2$(CH$_2$)$_k$O(O)C— | —(CH$_2$)$_k$S(CH$_2$)$_k$OC(O)— |
| —(CH$_2$)$_k$SO$_2$NR$_1$'(CH$_2$)$_k$O(O)C— | —(CH$_2$)$_k$SO$_2$— |
| —SO$_2$NR$_1$'(CH$_2$)$_k$O— | —SO$_2$NR$_1$'(CH$_2$)$_k$— |
| —(CH$_2$)$_k$O(CH$_2$)$_k$C(O)O— | —(CH$_2$)$_k$SO$_2$NR$_1$'(CH$_2$)$_k$C(O)O— |
| —(CH$_2$)$_k$SO$_2$(CH$_2$)$_k$C(O)O— | —CONR$_1$'(CH$_2$)$_k$C(O)O— |
| —(CH$_2$)$_k$S(CH$_2$)$_k$C(O)O— | —CH$_2$CH(OR$_2$')CH$_2$C(O)O— |
| —SO$_2$NR$_1$'(CH$_2$)$_k$C(O)O— | —(CH$_2$)$_k$O— |
| —C$_k$H$_{2k}$—OC(O)NH— | —C$_k$H$_{2k}$—NR$_1$'C(O)NH—, |
| —OC(O)NR'(CH$_2$)$_k$— | —(CH$_2$)$_k$NR$_1$'— and |
| —(CH$_2$)$_k$NR$_1$'C(O)O—. | |

9. The composition of claim 1 wherein said $R^2$ group of said fluorochemical fluorochemical oligomeric compound is an aliphatic group of 12 to 75 carbon atoms.

10. The composition of claim 1 wherein the sum of carbons atoms in said $R^2$ and $R^5$ groups of said fluorochemical oligomeric compound is 12 to 100.

11. The composition of claim 1, wherein a of said fluorochemical oligomeric moiety is at least 4, and b of said fluorochemical oligomeric moiety is zero.

12. The composition of claim 1, wherein said base component is a liquid at 30° C.

13. The composition of claim 1, where b of said fluorochemical oligomeric moiety is 0.

14. The composition of claim 12, wherein said base component is a silicone oil.

15. The composition of claim 12 wherein said base component is a hydrocarbon oil.

16. The composition of claim 1 wherein said base component is an aqueous emulsion of wax.

17. The composition of claim 1, wherein said fluorochemical oligomeric compound is the reaction product of
a) a fluorochemical oligomer of the formula

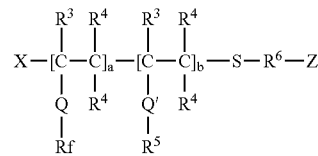

wherein
$R^6$ is an aliphatic or aromatic group and Z is an isocyanate-reactive group,
b) a isocyanate of the formula $R^1(NCO)_x$, wherein x is 2 to 6, wherein $R^1$ is an aliphatic, alicyclic or aromatic group, and
c) an aliphatic compound of the formula $R^2$-$(Z)_q$, where $R^2$ is a aliphatic group, Z is an isocyanate reactive group and q is 1 to 4.

18. The composition of claim 1, wherein said fluorochemical oligomeric compound is the reaction product of
a) a fluorochemical oligomer of the formula

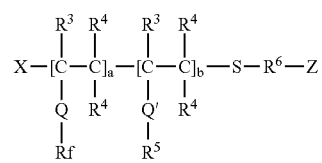

wherein
$R^6$ is an aliphatic or aromatic group,
$R^5$ is a non-fluorinated aliphatic group of 12 to 75 carbons atoms, and
Z is an isocyanate-reactive group, and
b) a polyisocyanate of the formula $R^1(NCO)_x$, wherein x is 1 to 6, wherein $R^1$ is an aliphatic, alicyclic or aromatic group.

19. The composition of claim 1, wherein said fluorochemical oligomeric compound is of the formula:

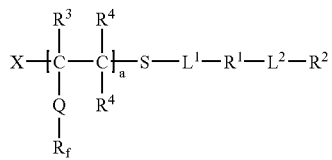

wherein

R³ is hydrogen;

each R⁴ is independently hydrogen or straight chain or branched chain alkyl containing 1 to about 4 carbon atoms;

Q is an organic linking group, $R_f$ is a fluoroaliphatic group that comprises a fully fluorinated terminal group;

X is a hydrogen atom or a group derived from a free radical initiator;

$L^1$ and $L^2$ are independently divalent linking groups, $R^1$ is the residue of an organic polyisocyanate, $R^2$ is an aliphatic group of 12 to 75 carbon atoms, and a is 3 to 7.

20. The polish composition of claim 1 further comprising a solvent.

21. An article comprising:

a substrate having one or more surfaces; and the composition of claim 1 coated on one or more surfaces of said substrate.

* * * * *

UNITED STATES PATENT AND TRADEMARK OFFICE
CERTIFICATE OF CORRECTION

| | | |
|---|---|---|
| PATENT NO. | : 7,300,976 B2 | |
| APPLICATION NO. | : 10/865147 | |
| DATED | : November 27, 2007 | |
| INVENTOR(S) | : Mitchell T. Johnson | |

It is certified that error appears in the above-identified patent and that said Letters Patent is hereby corrected as shown below:

Column 5,
Line 46, delete "ω-diols," and insert -- ω,-diols, --, therefor.

Lines 64-65, delete "(Seconded.," and insert -- (Second ed., --, therefor.

Column 12,
Line 6, delete "$R^2=R_f$)." and insert -- $R^2=R_f$). --, therefor.

Column 20,
Line 45, in the table, delete "Castel," and insert -- Castle, --, therefor.

Column 23,
Line 9, in Claim 1, delete "Rf" and insert -- $R_f$ --, therefor.

Line 13, in Claim 1, delete "aromtic" and insert -- aromatic --, therefor.

Column 24,
Line 8, in Claim 9, before "oligomeric" delete "fluorochemical".

Line 37, in Claim 17, in the structure delete "Rf" and insert -- $R_f$ --, therefor.

Line 42, in Claim 17, delete "isocyanate" and insert -- polyisocyanate --, therefor.

Line 57, in Claim 18, in the structure, delete "Rf" and insert -- $R_f$ --, therefor.

Line 66, in Claim 18, delete "1" and insert -- 2 --, therefor.

UNITED STATES PATENT AND TRADEMARK OFFICE
CERTIFICATE OF CORRECTION

| | | |
|---|---|---|
| PATENT NO. | : 7,300,976 B2 | |
| APPLICATION NO. | : 10/865147 | |
| DATED | : November 27, 2007 | |
| INVENTOR(S) | : Mitchell T. Johnson | |

It is certified that error appears in the above-identified patent and that said Letters Patent is hereby corrected as shown below:

Column 26,
Line 6, in Claim 19, delete "divalent" and insert -- isocyanate-derived --, therefor.

Signed and Sealed this

Second Day of December, 2008

JON W. DUDAS
*Director of the United States Patent and Trademark Office*